United States Patent
Glantz et al.

[15] 3,669,385
[45] June 13, 1972

[54] AIRCRAFT OF IMPROVED AND SIMPLIFIED CONSTRUCTION

[72] Inventors: Earl Glantz, Baldwin; Jean W. McComas, Islip, both of N.Y.

[73] Assignee: Fairchild Industries, Inc., Montgomery County, Md.

[22] Filed: Oct. 8, 1970

[21] Appl. No.: 79,197

[52] U.S. Cl. ........................................... 244/13
[51] Int. Cl. ........................................... B64c 1/26
[58] Field of Search ............... D22/11; 273/105.3; 244/13, 244/1, 2, 3, 120, 124

[56] References Cited

UNITED STATES PATENTS

| | | | |
|---|---|---|---|
| D190,454 | 5/1961 | McCrackin | 22/11 |
| 2,380,289 | 7/1945 | Burnelli | 244/124 |
| 3,017,137 | 1/1962 | Helmke et al. | 244/124 |
| 3,204,890 | 9/1965 | Lehn et al. | 244/3 |
| 3,100,093 | 8/1963 | McQuillen et al. | 244/3 |
| 2,998,208 | 8/1961 | Di Perna | 244/2 |

Primary Examiner—Milton Buchler
Assistant Examiner—C. A. Rutledge
Attorney—Michael W. York

[57] ABSTRACT

An aircraft of improved of simplified construction having forward and aft generally cylindrical and substantially identical fuselage sections that are connected to a central fuselage section that houses an engine that has an inlet located above the forward fuselage section for powering the aircraft in flight. The central long axis of the aft fuselage section is located above the central long axis of the forward fuselage section. Wings are connected to the central fuselage section and a tail assembly is connected to the aft portion of the aft fuselage section. Many of the component parts of the aircraft are interchangeable and the aircraft is especially suited for use as a drone for towing aerial targets.

15 Claims, 12 Drawing Figures

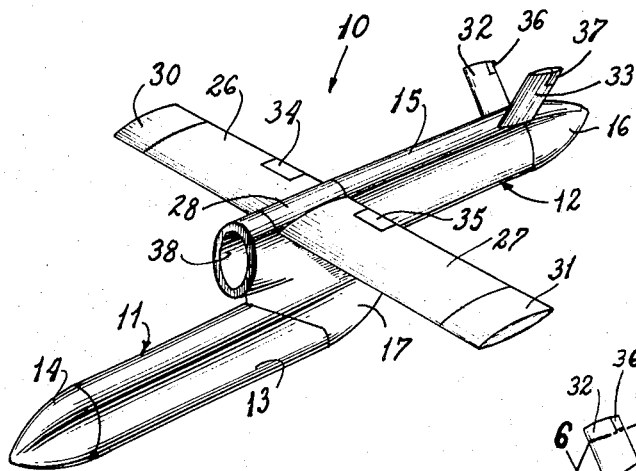
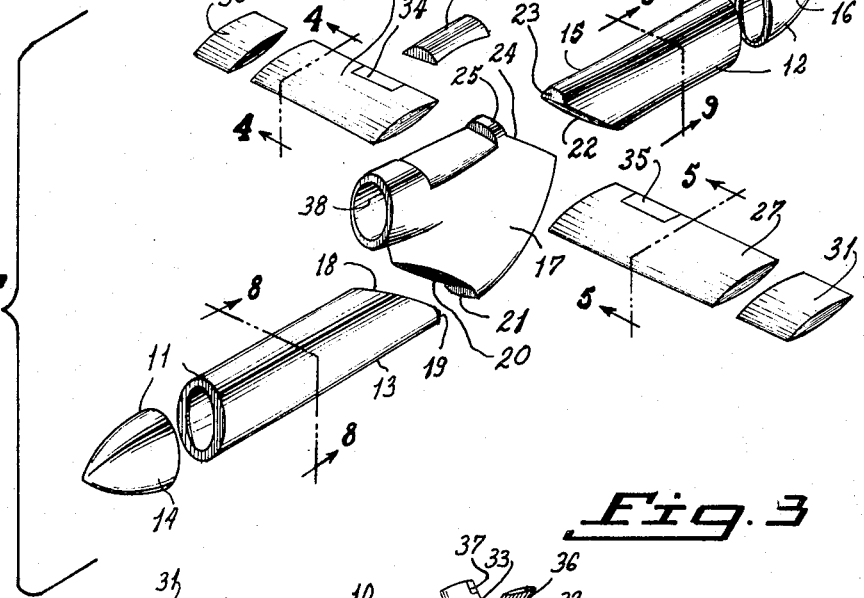
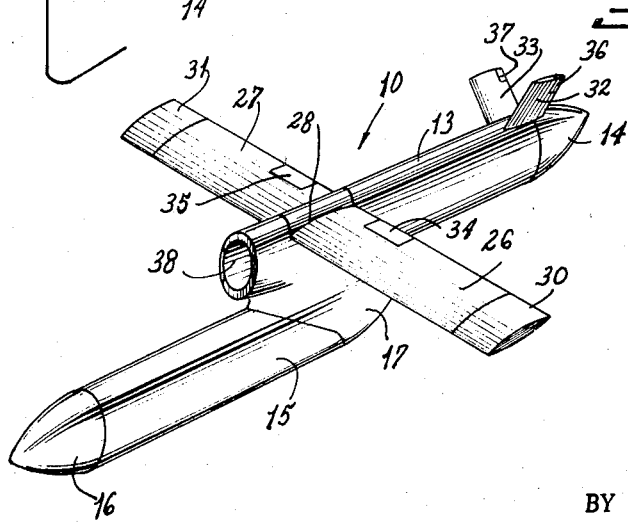

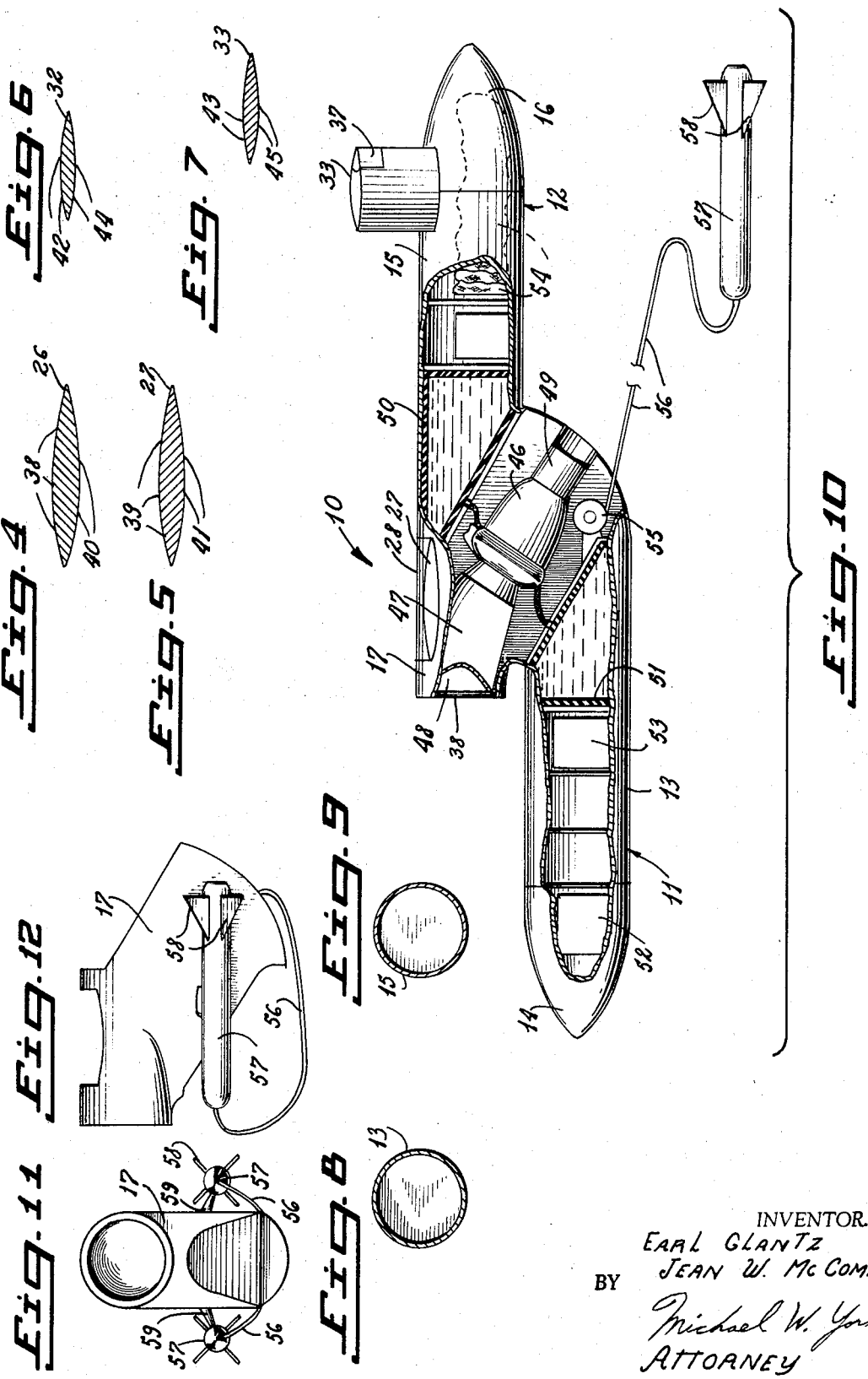

AIRCRAFT OF IMPROVED AND SIMPLIFIED CONSTRUCTION

BACKGROUND OF THE INVENTION

Many modern aircraft are highly complex and possess highly sophisticated designs and thus are difficult and expensive to manufacture, repair, and to service. Such highly complex and sophisticated designs are entirely unneeded and are undesirable in aircraft whose mission or purpose does not place demands upon the aircraft that require such a high degree of sophistication. Drone or pilotless aircraft that are used to tow aerial targets are typical of such aircraft that do not require a high degree of sophistication and that benefit from simplicity of design.

Drone aircraft that tow aerial targets are commonly launched into the air with the aid of a booster rocket or by the use of a catapult and then are sustained in the air with the aid of a turbojet engine or some similar engine. Commonly, only a limited fuel supply is provided for the turbojet engine since the required flight time is usually short. Usually, these drone aircraft carry a number of targets and extend them upon receipt of the proper radio signals from the ground one at a time for some distance behind the aircraft so that the targets can be fired at with anti-aircraft guns, surface to air missiles or air to air missiles. After the aircraft has made a number of passes and as a result of radio control signals from the ground and all the towed targets have been fired at, the engine of the aircraft is usually shut off or the fuel is exhausted and a parachute is deployed from the aircraft so that the aircraft parachutes to the ground. Since the aircraft is usually parachuted to the ground rather than being landed under power using conventional landing gear, the drone aircraft is subjected to a certain amount of damage upon impact with the ground or obstacles that may be present on the ground.

Since a drone aircraft is subject to potential damage upon impact with the ground, it is important that the expensive components of the aircraft such as the engine be protected, insofar as it is possible, from such damage. It is also important that the structural elements that are most susceptible to damage be readily replaceable or repairable so that the drone aircraft can be reused.

With drone target towing aircraft it is highly desirable for economic reasons to be able to refuel the aircraft in the field and reuse it for towing another series of targets without having to recycle the used drone aircraft to a repair and service depot or station. Unfortunately in the past this has usually not been possible since even if the aircraft is undamaged after impact with the ground, dirt, dust and other debris usually is stirred up upon impact with the ground and this gets into the engine air intake and prevents reuse of the engine until it has been cleaned out.

Drone aircraft are also susceptible to occasionally being hit by misdirected cannon fire or missiles and since this is likely to result in destruction of the aircraft it is important from an economic viewpoint that the costs to manufacture the drone aircraft be as low as possible. Such low manufacturing costs have not been achieveable in many instances in the past since the design of the drone aircraft required the manufacture of a comparatively large number of components or parts that were not interchangeable and this required expensive tooling and fixtures.

Complexity of the design of target towing drone aircraft is also undesirable since such aircraft are commonly shipped in their unassembled or partially assembled condition and assembly must be completed prior to flight. A complex design and a large number of the various different parts results in an increase the time and effort required to assemble the drone aircraft and this is undesirable since it increases the time and difficulty required to prepare for range practice.

SUMMARY OF THE INVENTION

This invention relates to aircraft and more particularly to an aircraft of simplified design and construction.

It is accordingly an object of the present invention to provide an aircraft that is simple to manufacture and assemble.

It is also an object of the present invention to provide an aircraft that is easy to repair and service.

It is also an object of the present invention to provide an aircraft having a stabilized center of gravity.

Another object of the present invention is to provide an aircraft that is capable of readily being used as a drone for towing targets.

The present invention provides an aircraft having a forward fuselage section, a center fuselage section having its lower forward portion connected to the aft end of the forward fuselage section and an aft fuselage section connected at its forward end to the upper aft portion of the center fuselage section. The aft fuselage section has its long central axis located above the long central axis of the forward fuselage section and the forward and aft fuselage sections have substantially the same exterior configuration. Both the forward and aft fuselage sections are interchangeable with and substitutable for each other. A right and a left wing are connected at their respective inner ends to the center fuselage section and they extend generally outwardly therefrom and a tail assembly is connected to the aft portion of the aft fuselage section. An engine is also located in the center fuselage section for propelling the aircraft in flight.

BRIEF DESCRIPTION OF THE DRAWINGS

The invention will be hereinafter more fully described with reference to the accompanying drawings in which:

FIG. 1 is a perspective view of the aircraft of the present invention;

FIG. 2 is an exploded perspective view of the aircraft illustrated in FIG. 1;

FIG. 3 is a perspective view of the aircraft of the present invention showing the interchangeability of certain of its component parts;

FIG. 4 is a sectional view taken on the plane indicated by the line 4—4 in FIG. 2;

FIG. 5 is a sectional view taken on the plane indicated by the line 5—5 in FIG. 2;

FIG. 6 is a sectional view taken on the plane indicated by the line 6—6 in FIG. 2;

FIG. 7 is a sectional view taken on the plane indicated by the line 7—7 in FIG. 2;

FIG. 8 is a sectional view taken on the plane indicated by the line 8—8 in FIG. 2;

FIG. 9 is a sectional view taken on the plane indicated by the line 9—9 in FIG. 2;

FIG. 10 is a side elevational view of the aircraft of the present invention with certain parts broken away;

FIG. 11 is a front view of part of the aircraft illustrated in FIG. 10 illustrating the manner in which targets can be attached to the aircraft; and FIG. 12 is a side elevational view of the structure illustrated in FIG. 11.

DETAILED DESCRIPTION OF THE PREFERRED EMBODIMENT

Referring to FIGS. 1 and 2, the aircraft 10 of the invention is illustrated. The aircraft 10 comprises a forward fuselage section 11 and an aft fuselage section 12 that is substantially cylindrical and is substantially identical in its external configuration to the forward fuselage section 11. The forward fuselage section 11 includes a cylindrical section 13 of uniform diameter and a semipointed end cone 14 attached to the forward end of the cylindrical section. The aft fuselage section 12 includes a cylindrical section 15 and a semi-pointed end cone 16 attached to the aft end of the cylindrical section 15 that are substantially identical in their external configurations to the respective cylindrical section 13 and the end cone 14. The forward substantially cylindrical fuselage section 11 is connected at its aft end to the forward lower end of a center fuselage section 17, and the aft substantially cylindrical fuselage section 12 is connected at its forward end to the upper aft end of the center fuselage section so that the long central axis of the aft substantially cylindrical fuselage section 12 is located above the long central axis of the substantially cylindrical forward fuselage section 11. As best illustrated in FIG. 2, the forward fuselage section has a sloping aft end 18 with a substantially right angle abutment 19. The sloping aft end 18 and the abutment 19 are adapted to fit against a corresponding matching sloping surface 20 and a matching right angle abutment 21 on the lower forward end of the central fuselage section 17. The aft fuselage section 12 also has a sloping forward end 22 with a substantially right angle abutment 23 that are substantially identical to the sloping aft end 18 and the abutment 19 of the forward fuselage section 11. The forward end 22 and the abutment 23 of the aft fuselage section are adapted to fit against a corresponding matching sloping surface 24 and abutment 25 on the upper aft end of the center fuselage section 17. The aircraft 10 includes a right wing 26 and a left wing 27 that have substantially uniform cross sections or shapes throughout their lengths that are connected at their inner end portions to the upper portion of the center fuselage section 17 and that extend generally outwardly from the center fuselage section. An insert 28 is also provided that is adapted to fit into a recess 29 in the upper surface of the center fuselage section 17 that is adapted to receive the inner ends of the wings 26 and 27. The insert 28 is adapted to fit against the upper surface of the inner end portions of the wings 26 and 27 and its outside configuration is designed to conform to the general configuration of the upper surface of the center fuselage section 17.

A right wing tip 30 is attached to the outer end of the right wing 26 and a left wing tip 31 that is substantially identical to the right wing tip 30 is attached to the outer end of the left wing 27. A tail assembly that comprises a right fin 32 and a left fin 33 is connected to the upper portion of the aft surface of the aft fuselage section 12. The lower end of the right fin 32 is connected to the right side of the upper portion of the aft fuselage section 12 so that the fin extends upward and outwardly to the right from the fuselage section. The left fin 33 is substantially identical to the right fin 32 and its lower end is connected to the left side of the upper portion of the aft fuselage section 12 so that the fin extends upwardly and outwardly to the left from the fuselage section. The right and left fins 32 and 33 have substantially uniform cross sections or shapes throughout their lengths so that they have substantially no taper. The right wing 26 and the left wing 27 have an aileron 34 and aileron 35 located respectively in their trailing edges and the right fin 32 and the left fin 33 have an elevator 36 and elevator 37 located in their respective upper portion of their trailing edge. The center fuselage section 17 has an air inlet 38 located in its upper forward end above the level of the upper surface of the forward fuselage section 11 that is adapted to permit air to pass to the engine of the aircraft.

FIG. 3 illustrates the manner in which various components of the aircraft 10 can be interchanged. As illustrated in FIG. 3, the aft cylindrical section 15 is interchangeable with and can be substituted for the forward cylindrical section 13. The aft end cone 16 is also interchangeable with and can be substituted for the forward end cone 14. In a similar manner the forward cylindrical section 13 is interchangeable with and can be substituted for the aft cylindrical section 15. The forward end cone 14 is also interchangeable with and can be substituted for the aft end cone 16. The right wing 26 is interchangeable with and can be substituted for the left wing 27 and the left wing 27 is interchangeable with and can be substituted for the right wing 26. The right wing tip 30 and the left wing tip 31 are also illustrated as being interchangeable and being capable of being substituted for each other. The right fin 32 is also interchangeable with the left fin 33 and can be substituted for this fin. In addition, the left fin 33 is also interchangeable with the right fin 32 and can be substituted for this fin.

The right and left wings 26 and 27 are of uniform cross section throughout their lengths and as illustrated in FIGS. 4 and 5 the cross section of the wing 26 is identical to that of the wing 27. In addition, the shape of the upper surfaces 38 and 39 of the respective wings 26 and 27 is substantially identical to the shape of the respective lower surfaces 40 and 41 of the wings and consequently this facilitates the interchangeability of the wings. In a similar manner, as indicated in FIGS. 6 and 7, the shape of the surfaces 42 and 43 of one side of the respective fins 32 and 33 is substantially identical to the shape of the other sides 44 and 45 of the respective fins and the fins have identical cross sections.

As illustrated in FIGS. 8 and 9 the cross section of the forward cylindrical section 13 and the cross section of the aft cylindrical section 15 are substantially identical and are substantially circular. This similarity between the right and left wings 26 and 27, the fins 32 and 33, the forward cylindrical section 13 and the aft cylindrical section 15 plus the simplicity of their design reduces the difficulties and the cost of manufacturing these structures.

The interior construction of the aircraft 10 is illustrated in FIG. 10. The center fuselage section 17 contains propulsion means for propelling the aircraft in flight which is the preferred embodiment comprises a light weight, simple, short life turbojet engine 46. The engine 46 is tilted so that it has an engine air intake 47 located at its forward end that has an air intake opening 48 that is located in the forward upper end of the center fuselage section 17 above the forward fuselage section 11. The tilted engine 46 also has an engine exhaust 49 located within the lower aft portion of the center fuselage section below the level of the lower surface of the aft fuselage section that is adapted to direct engine exhaust gases downwardly below the aft fuselage section 12. A rubber fuel tank 50 is located in the forward section of the aft fuselage section 12 for providing fuel for the operation of the engine 46. Another fuel tank 51 is located in the aft section of the forward fuselage section 11 for also providing fuel to the engine 46. The location of the engine 46 in the center fuselage section 17 is important since this permits the center of thrust of the engine to pass through or close to the center of gravity of the aircraft and this reduces or eliminates undesirable moments that could adversely affect aircraft performance. The utilization of two fuel tanks with one fuel tank 50 located in the aft fuselage section and the other fuel tank 51 located in the forward fuselage section is also important since by feeding approximately equal amounts of fuel from both of the tanks to the engine there is no shift in the center of gravity of the aircraft as the fuel is consumed in flight and thus undesirable moments about the center of gravity are avoided.

A radio receiver 52 is located in the forward end cone 14 for receiving radio signals from the ground that are used to control the aircraft. A flight control box 53 is located in the aft portion of the forward cylindrical section 13 that generates commands based on the radio signals received that control the positions of the ailerons 34 and 35 and the elevators 36 and 37. A recovery parachute 54 is located in the aft portion of the aft cylindrical section 15 and in the aft end cone 16 that is adapted to be deployed for parachuting the aircraft 10 to the ground after the aircraft has completed its mission. The details of the parachute deployment system are not shown since various deployments systems that can be utilized are familiar to those skilled in the art. In general, the aft end cone 16 can be opened and a drogue chute deployed that will in turn deploy the main parachute 54.

Located in the aft lower end of the center fuselage section 17 is means for towing a target that comprises a reel 55 that has a target tow line cable 56 wound around it that is adapted to reel out the cable so that a tow target 57 that is connected to the end of the cable is deployed behind the aircraft 10. The target 57 is cylindrical in shape and has a rounded nose. Fins 58 extend from the aft end of the target in order to give the target aerodynamic stability in flight. The target 57 may contain a source of infrared radiation so that it can be used to attract various types of heat seeking missiles. The center fuselage section 17 is illustrated in FIGS. 11 and 12, and as illustrated one target 57 can be mounted on each side of the aircraft on a pylon 59 that is connected to the outside of each side of the center fuselage section.

In normal use the aircraft 10 is shipped to the receiving depot with its various parts that are illustrated in FIG. 2 being assembled except for the wings 26, 27, the wing tips 30, 31 and the tail fins 32 and 33. The aircraft is then assembled at the depot prior to being used. Assembly of the aircraft 10 is facilitated since the wings 26, 27, including the wing tips 30, 31, and the fins 32 and 33 are interchangeable with each other. This interchangeability reduces the number of different types of parts that are involved and this consequently reduces the complexity of the assembly operation and reduces the number of man hours required for assembly. After assembly, the assembled aircraft 10 is normally sent to the field where it is fueled and then launched into the air using a catapult system or a booster (not shown) that are familiar to those skilled in the art. The engine 46 is started before the aircraft 10 is launched and the aircraft is guided to the range area through the use of conventional radio signals. Radio signals are also used in a conventional manner to cause the release of the targets 57 from the pylons 59 so that the targets are trailed behind the aircraft so that they can be fired at. After the last target 57 has been hit the parachute 54 is deployed and engine 46 is shut off as a result of radio signals from the ground. Normally, the aircraft 10 will be parachuted to the ground in its horizontal flight attitude so that the lower side of the forward fuselage section 11 strikes the ground. In view of the location of the engine air intake inlet 48 above the forward fuselage section 11, the inlet is protected from debris that may be stirred up when the aircraft impacts with the ground. This important feature of the invention permits the aircraft 10 to be refueled and reflown without the necessity of cleaning debris from the engine 46 and the engine intake 47.

Should the aircraft 10 be damaged upon impact with the ground, repair of the aircraft is facilitated since the interchangeability of its component parts reduces the number of different types of spare parts that are required to be kept on hand for repair purposes. In addition, an aircraft that is too badly damaged to be repaired can be readily cannibalized for its interchangeable component parts that are undamaged.

Although the invention has been described with reference to preferred embodiments, it will be understood that variations and modifications may be made within the spirit and scope of the invention as defined in the appended claims.

What is claimed is:

1. An aircraft comprising a forward fuselage section, a center fuselage section having its lower forward portion connected to the aft end of said forward fuselage section, an aft fuselage section connected at its forward end to the upper aft portion of said center fuselage section, said aft fuselage section having its long central axis located above the long central axis of said forward fuselage section, said forward and aft fuselage sections having substantially the same exterior configuration, said forward fuselage section being interchangeable with and substitutable for said aft fuselage section, said aft fuselage section being interchangeable with and substitutable for said forward fuselage section, a right and a left wing connected at their respective inner ends to said center fuselage section and extending generally outwardly therefrom, a tail assembly connected to the aft portion of said aft fuselage section, and an engine located in said center fuselage section for propelling said aircraft in flight.

2. The aircraft of claim 1 wherein said center fuselage section has an engine air inlet located in its upper forward portion above the level of the upper surface of said forward fuselage section and wherein said center fuselage section has an engine exhaust located in its lower aft portion below the level of the lower surface of said aft fuselage section.

3. The aircraft of claim 2 wherein said forward fuselage section and said aft fuselage section each includes a cylindrical section.

4. The aircraft of claim 3 wherein said engine is tilted in order that the engine air intake is located in the upper forward portion of said center fuselage section and the engine exhaust is located in the lower aft portion of said center fuselage section.

5. The aircraft of claim 4 further comprising at least one fuel tank located in said forward fuselage section and at least one fuel tank located in said aft fuselage section.

6. The aircraft of claim 5 wherein said forward fuselage section and said aft fuselage section each further comprises an end cone connected to the end of said cylindrical section and wherein said end cones are interchangeable with and substitutable for each other.

7. The aircraft of claim 6 wherein said cylindrical sections each have a substantially circular cross section.

8. The aircraft of claim 7 wherein said forward fuselage section has a sloping aft end, said aft fuselage section has a sloping forward end, and said center fuselage section has a corresponding matching sloping surface on its lower forward end that is adapted to receive the sloping aft end of said forward fuselage section and a corresponding matching sloping surface on its upper aft end that is adapted to receive the sloping forward end of said aft fuselage section.

9. The aircraft of claim 8 wherein said center fuselage section has a recess in its upper surface that is adapted to receive the inner ends of said wings and further comprising an insert that is adapted to fit in the recess in said center fuselage section, said insert being shaped to fit against the upper surfaces of the inner end portions of said wings.

10. The aircraft of claim 9 further comprising a target mounting pylon connected to each side of said center fuselage section and a target towing reel located inside said center fuselage section.

11. The aircraft of claim 4 wherein said right wing and said left wing have substantially the same configuration and are interchangeable with and substitutable for each other.

12. The aircraft of claim 11 further comprising a right wing tip attached to the outer end of said right wing, a left wing tip attached to the outer end of said left wing and wherein said left and right wing tips are substantially identical and are interchangeable with and substitutable for each other.

13. The aircraft of claim 12 wherein the upper surface of said right wing is substantially identical to the lower surface of said right wing and the upper surface of said left wing is substantially identical to the lower surface of said left wing.

14. The aircraft of claim 13 wherein said right wing and said left wing each have a uniform cross section throughout their lengths.

15. The aircraft of claim 14 wherein said tail assembly comprises a right fin and a left fin, and said left and right fins are substantially identical and are interchangeable with and substitutable for each other.

* * * * *